United States Patent
Fujishiro

(10) Patent No.: US 10,735,982 B2
(45) Date of Patent: Aug. 4, 2020

(54) RADIO TERMINAL AND BASE STATION FOR MONITORING A PHYSICAL DOWNLINK CONTROL CHANNEL DURING A DISCONTINUOUS RECEPTION OPERATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/574,093

(22) PCT Filed: May 13, 2016

(86) PCT No.: PCT/JP2016/064230
§ 371 (c)(1),
(2) Date: Nov. 14, 2017

(87) PCT Pub. No.: WO2016/186016
PCT Pub. Date: Nov. 24, 2016

(65) Prior Publication Data
US 2018/0302810 A1    Oct. 18, 2018

Related U.S. Application Data
(60) Provisional application No. 62/162,123, filed on May 15, 2015.

(51) Int. Cl.
*H04W 24/08*    (2009.01)
*H04W 52/02*    (2009.01)
*H04W 76/28*    (2018.01)

(52) U.S. Cl.
CPC ........... *H04W 24/08* (2013.01); *H04W 52/02* (2013.01); *H04W 76/28* (2018.02); *Y02D 70/00* (2018.01)

(58) Field of Classification Search
CPC .............................. H04W 24/08; H04W 52/02
See application file for complete search history.

(56) References Cited

U.S. PATENT DOCUMENTS

| | | | |
|---|---|---|---|
| 9,462,546 B2 | 10/2016 | Ohta et al. | |
| 2008/0186892 A1* | 8/2008 | Damnjanovic | H04W 52/44 370/311 |
| 2009/0073907 A1* | 3/2009 | Cai | H04W 76/28 370/311 |

(Continued)

FOREIGN PATENT DOCUMENTS

| | | |
|---|---|---|
| WO | 2012/086039 A1 | 6/2012 |
| WO | 2014/035074 A1 | 3/2014 |

OTHER PUBLICATIONS

International Search Report issued in PCT/JP2016/064230; dated Jul. 26, 2016.

*Primary Examiner* — Jael M Ulysse
(74) *Attorney, Agent, or Firm* — Studebaker & Brackett PC

(57) ABSTRACT

A radio terminal according to one embodiment comprises a controller configured to monitor a PDCCH within an On duration occurring every DRX cycle, and a receiver configured to receive, from a base station, special downlink control information not including scheduling information via the PDCCH within the On duration. The controller continues the monitoring of the PDCCH across a DRX inactivity duration, in response to the reception of the special downlink control information.

3 Claims, 13 Drawing Sheets

(56) References Cited

U.S. PATENT DOCUMENTS

| | | | | |
|---|---|---|---|---|
| 2009/0175186 A1* | 7/2009 | Du | ............... | H04W 76/28 370/252 |
| 2009/0238105 A1* | 9/2009 | Wu | ............... | H04W 52/0216 370/311 |
| 2009/0316638 A1* | 12/2009 | Yi | ............... | H04W 24/08 370/329 |
| 2010/0110897 A1* | 5/2010 | Chun | ............... | H04L 43/0811 370/241 |
| 2010/0118815 A1* | 5/2010 | Kim | ............... | H04W 52/0216 370/329 |
| 2010/0322173 A1* | 12/2010 | Marinier | ............... | H04L 5/001 370/329 |
| 2011/0002281 A1* | 1/2011 | Terry | ............... | H04W 52/0216 370/329 |
| 2011/0021154 A1* | 1/2011 | Marinier | ............... | H04W 72/02 455/67.11 |
| 2011/0103315 A1* | 5/2011 | Camp, Jr. | ............... | H04L 1/1854 370/329 |
| 2011/0205928 A1* | 8/2011 | Pelletier | ............... | H04W 24/00 370/252 |
| 2011/0292851 A1* | 12/2011 | Fong | ............... | H04L 5/001 370/311 |
| 2012/0033595 A1* | 2/2012 | Aoyama | ............... | H04W 76/28 370/311 |
| 2012/0157153 A1* | 6/2012 | Song | ............... | H04W 52/0245 455/522 |
| 2012/0213137 A1* | 8/2012 | Jeong | ............... | H04W 72/1289 370/311 |
| 2012/0281566 A1* | 11/2012 | Pelletier | ............... | H04W 76/27 370/252 |
| 2013/0163497 A1* | 6/2013 | Wei | ............... | H04L 5/0055 370/311 |
| 2013/0182626 A1* | 7/2013 | Kuo | ............... | H04W 52/0216 370/311 |
| 2013/0215809 A1* | 8/2013 | Chang | ............... | H04W 52/0235 370/311 |
| 2013/0235780 A1* | 9/2013 | Kim | ............... | H04W 72/0406 370/311 |
| 2013/0265866 A1* | 10/2013 | Yi | ............... | H04W 74/0841 370/216 |
| 2013/0301421 A1* | 11/2013 | Yi | ............... | H04W 52/0216 370/241 |
| 2014/0029459 A1* | 1/2014 | Kwon | ............... | H04W 76/28 370/252 |
| 2014/0119198 A1* | 5/2014 | Lee | ............... | H04W 52/0216 370/241 |
| 2014/0198696 A1* | 7/2014 | Li | ............... | H04W 52/0229 370/311 |
| 2014/0295820 A1* | 10/2014 | Kim | ............... | H04W 24/02 455/418 |
| 2015/0009832 A1* | 1/2015 | Dalsgaard | ............... | H04W 72/1221 370/241 |
| 2015/0098452 A1* | 4/2015 | Dalsgaard | ............... | H04W 24/08 370/336 |
| 2015/0117286 A1* | 4/2015 | Kim | ............... | H04W 72/042 370/311 |
| 2015/0131505 A1* | 5/2015 | Dai | ............... | H04W 52/0225 370/311 |
| 2015/0215929 A1* | 7/2015 | Damnjanovic | ............... | H04L 5/001 370/241 |
| 2016/0366722 A1* | 12/2016 | Heo | ............... | H04L 1/1812 |

* cited by examiner

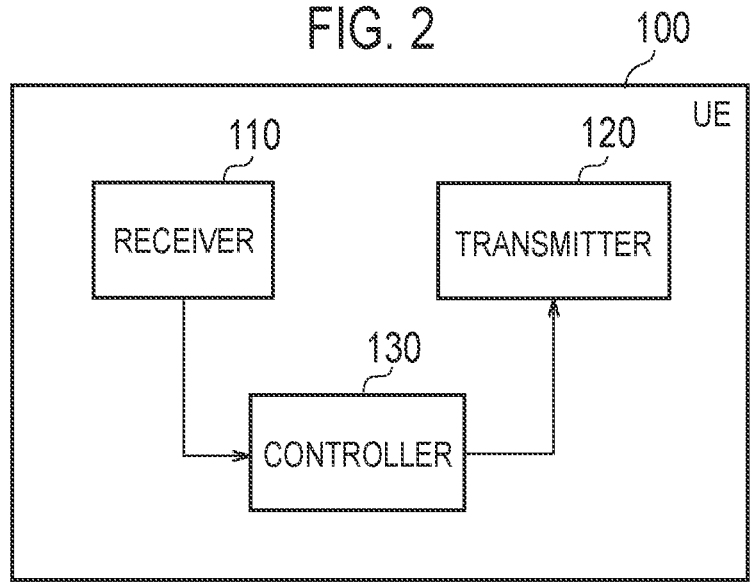
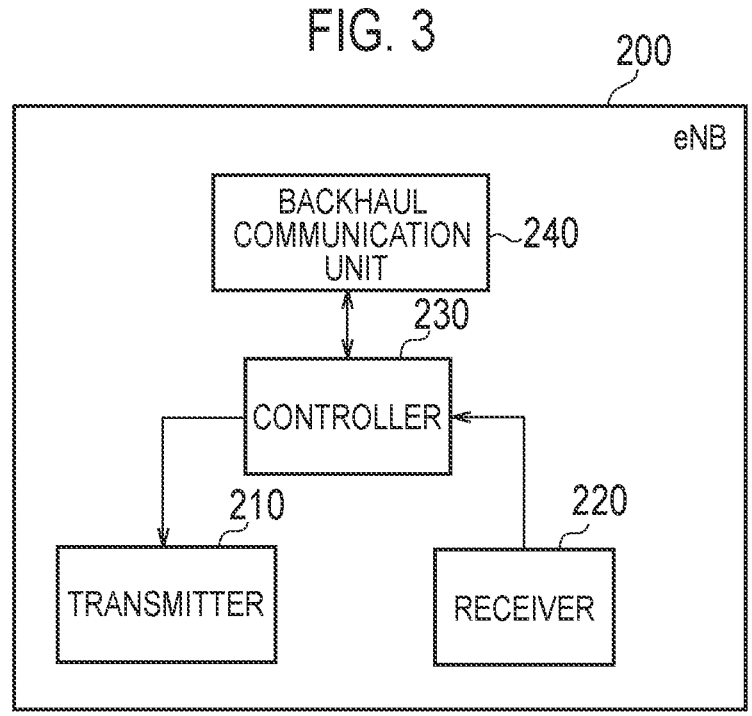

FIG. 13
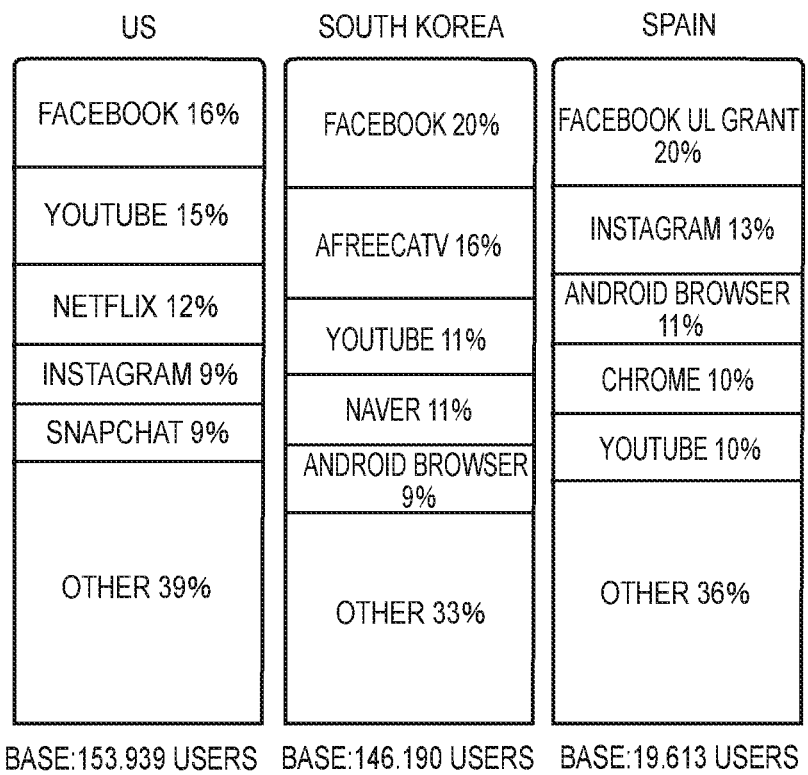
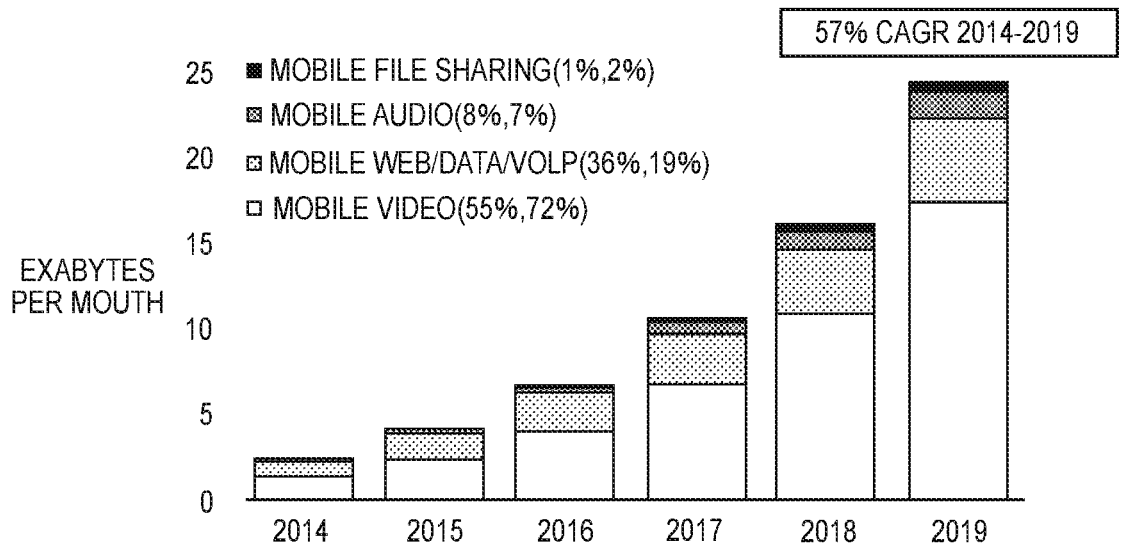

RADIO TERMINAL AND BASE STATION FOR MONITORING A PHYSICAL DOWNLINK CONTROL CHANNEL DURING A DISCONTINUOUS RECEPTION OPERATION

TECHNICAL FIELD

The present application relates to a radio terminal and a base station used in a mobile communication system.

BACKGROUND ART

In 3GPP (Third Generation Partnership Project) which is a project aiming to standardize a mobile communication system, the introduction of a latency reduction function of reducing latency in radio communication has been considered. As a technology for realizing such a latency reduction function, a high-speed uplink access technology, a TTI (Transmission Time Interval) shortening technology and the like may be mentioned.

SUMMARY

A radio terminal according to one embodiment comprises a controller configured to monitor a PDCCH (Physical Downlink Control Channel) within an On duration occurring every DRX (Discontinuous reception) cycle, and a receiver configured to receive, from a base station, special downlink control information not including scheduling information via the PDCCH within the On duration. The controller continues the monitoring of the PDCCH across a DRX inactivity duration, in response to the reception of the special downlink control information.

A base station according to one embodiment comprises a controller configured to perform communication with a radio terminal configured to monitor a PDCCH within an On duration occurring every DRX cycle. The controller is configured to perform a process of transmitting, to the radio terminal, special downlink control information not including scheduling information via the PDCCH within the On duration. The special downlink control information is used for the radio terminal to continue the monitoring of the PDCCH across a DRX inactivity duration.

A radio terminal according to one embodiment comprises a controller configured to monitor a PDCCH within an On duration occurring every DRX cycle, and a transmitter configured to transmit, to a base station, a notification indicating that reception of downlink data is predicted when transmitting uplink data to the base station. The controller is configured to continuously monitor the PDCCH even out of the On duration in a predetermined duration after transmitting the notification.

A base station according to one embodiment comprises a controller configured to perform communication with a radio terminal configured to monitor a PDCCH within an On duration occurring every DRX cycle, and a receiver configured to receive, from the radio terminal, a notification indicating that reception of downlink data is predicted when receiving uplink data from the radio terminal. The controller is configured to perform a process of transmitting downlink control information to the radio terminal via the PDCCH, even out of the On duration in a predetermined duration after receiving the notification.

A radio terminal according to one embodiment comprises a controller configured to monitor a PDCCH within an On duration occurring every DRX cycle. The controller is configured to monitor, after transmitting uplink data to a base station, a PHICH (Physical HARQ Indicator Channel) for receiving an ACK (Acknowledgement)/NACK (Negative ACK) corresponding to the uplink data from the base station. The controller is also configured to monitor the PDCCH when monitoring the PHICH even out of the On duration.

A base station according to one embodiment comprises a controller configured to perform communication with a radio terminal configured to monitor a PDCCH within an On duration occurring every DRX cycle. The controller is configured to perform a process of transmitting, to the radio terminal, an ACK/NACK corresponding to uplink data via a PHICH after receiving the uplink data from the radio terminal. The controller is configured to transmit to the radio terminal, downlink control information via the PDCCH when transmitting the ACK/NACK even out of the On duration.

BRIEF DESCRIPTION OF THE DRAWINGS

FIG. 2 is a block diagram of a UE (radio terminal).

FIG. 3 is a block diagram of an eNB (base station).

FIG. 13 includes a diagram illustrating top five applications based on the mobile traffic volume, and a diagram illustrating a mobile application analysis.

DESCRIPTION OF THE EMBODIMENT

Overview of Embodiments

A radio terminal performs a DRX (Discontinuous reception) operation in order to reduce power consumption. Specifically, the radio terminal monitors a PDCCH within an On duration occurring every DRX cycle. A base station comprehends the On duration in the radio terminal and transmits, within the On duration, downlink control information (DCI) via the PDCCH to the radio terminal. The DCI includes scheduling information indicating an allocation resource for the radio terminal.

After reception of data from a core network, the base station has to wait for data transmission to the radio terminal until the radio terminal is in the On duration. Hereinafter, the time from the reception of data from the core network by the base station, to the transmission of the data to the radio terminal, is referred to as "downlink transfer delay (DL transfer delay)". In particular, if the DRX cycle is long, the downlink transfer delay may become a serious problem.

In the embodiment below, a technology is disclosed by which the downlink transfer delay can be shortened.

[Mobile Communication System]

Hereinafter, an overview of an LTE (Long Term Evolution) system which is the mobile communication system according to the embodiments will be described below.

(Configuration of Mobile Communication System)

Figure 1:
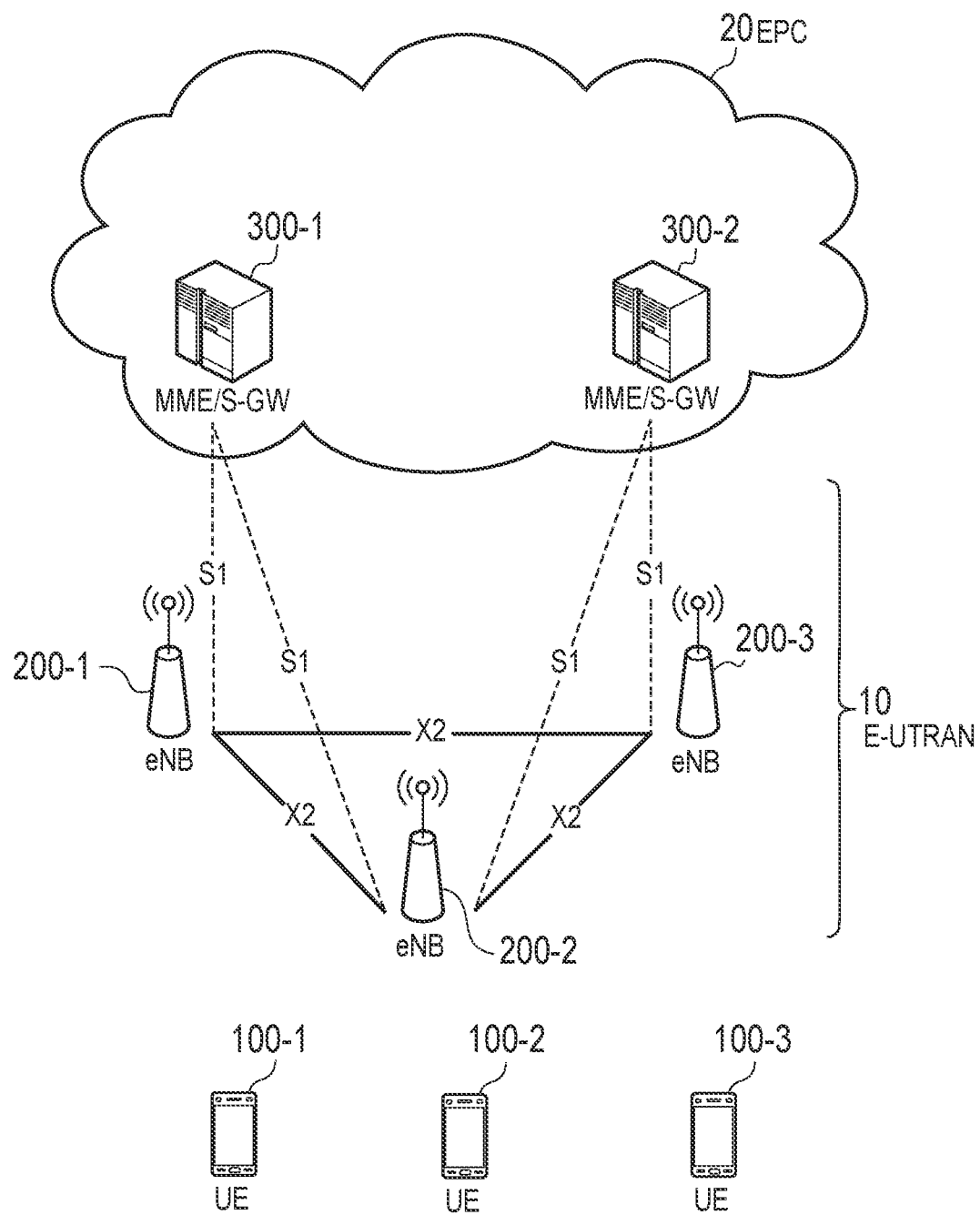
FIG. 1 is a diagram illustrating an LTE system (mobile communication system).

FIG. 1 is a diagram illustrating a configuration of the LTE system. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

(Configuration of Radio Terminal)

FIG. 2 is a block diagram of the UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes the above-described processes and below-described processes.

(Configuration of Base Station)

FIG. 3 is a block diagram of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described processes and below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

(Configuration of Radio Interface)

Figure 4:
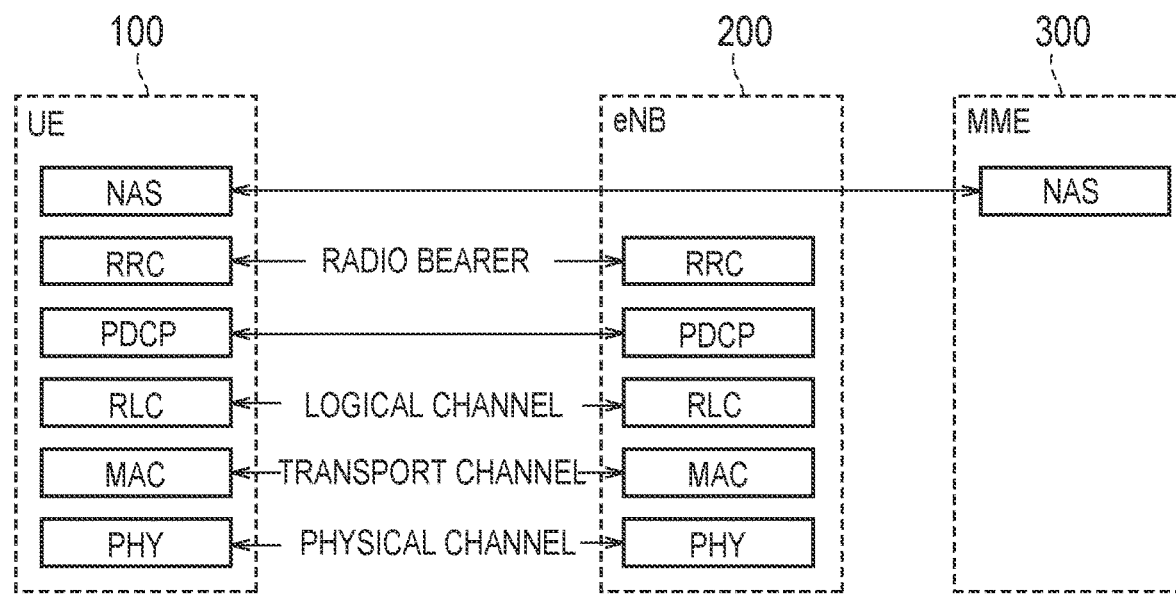
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

The UE 100 has fourth to seventh layers of the OSI reference model as the upper protocol of the radio interface protocol. The transport layer which is the fourth layer includes TCP (Transmission Control Protocol). TCP will be described later.

(Overview of Lower Layer of LTE)

Figure 5:
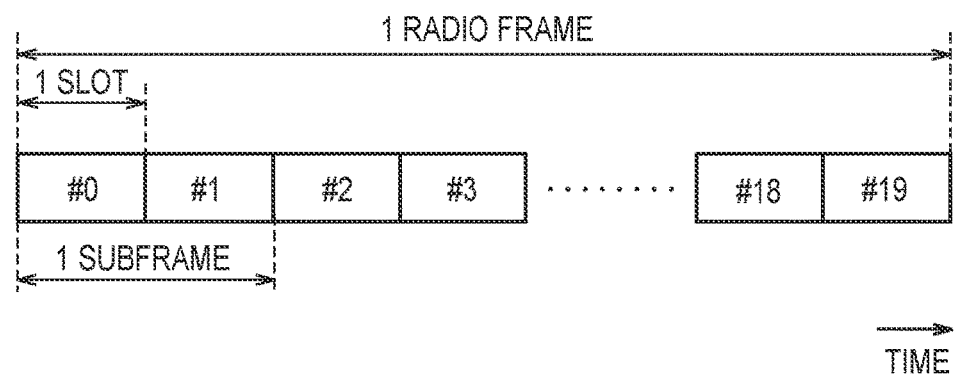
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information and a physical HARQ indicator channel (PHICH) for transmitting HARQ ACK/NACK information. Furthermore, the other portion of each subframe is a region available as a physical downlink shared channel (PDSCH) for mainly transmitting downlink data.

In general, the eNB 200 uses the PDCCH to transmit downlink control information (DCI) to the UE 100, and uses the PDSCH to transmit the downlink data to the UE 100. The downlink control information carried by the PDCCH includes uplink scheduling information, downlink scheduling information, and a TPC command. The uplink scheduling information is scheduling information related to an allocation of an uplink radio resource (UL grant), and the downlink scheduling information is scheduling information related to an allocation of a downlink radio resource. The TPC command is information for instructing an increase or decrease in the uplink transmission power. In order to identify a UE 100 to which the downlink control information is transmitted, the eNB 200 includes, into the downlink control information, a CRC bit scrambled by an identifier (RNTI: Radio Network Temporary ID) of the UE 100 to which the downlink control information is transmitted. Each UE 100 descrambles, by the RNTI of the UE 100, the CRC bit of the downlink control information that may be addressed to the UE 100 so as to perform blind decoding of the PDCCH to detect the downlink control information addressed to the UE 100. The PDSCH carries the downlink data by the downlink radio resource (resource block) indicated by the downlink scheduling information.

In the uplink, both ends in the frequency direction of each subframe are control regions used as a physical uplink control channel (PUCCH) for mainly transmitting an uplink control information. Furthermore, the other portion of each subframe is a region available as a physical uplink shared channel (PUSCH) for mainly transmitting uplink data.

In general, the UE 100 uses the PUCCH to transmit uplink control information (UCI) to the eNB 200, and uses the PUSCH to transmit the uplink data to the eNB 200. The uplink control information carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) available for the downlink transmission. The SR is information for requesting an allocation of a PUSCH resource. The HARQ ACK/NACK is delivery acknowledgment information indicating whether or not the downlink data is correctly received.

(DRX in RRC Connected Mode)

Figure 6:
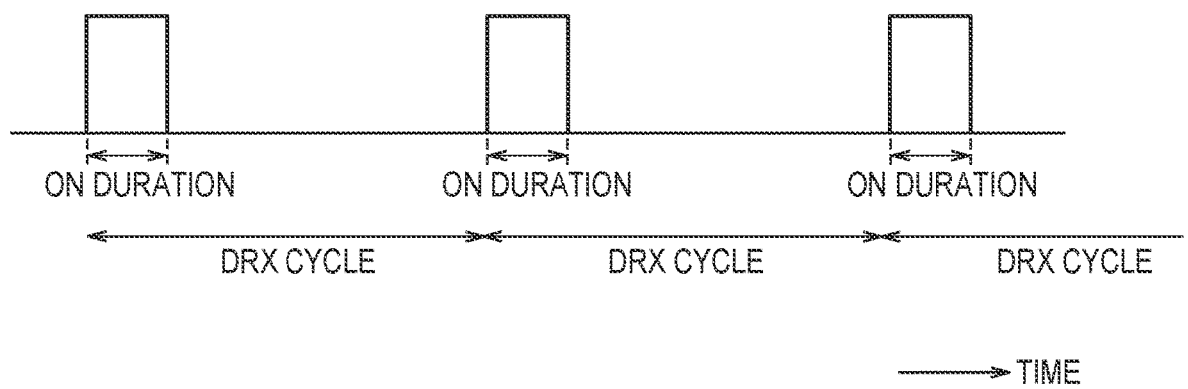
FIG. 6 is a diagram illustrating an operation of a UE in a DRX state in an RRC connected mode.

A DRX in an RRC connected mode will be described, below. FIG. 6 is a diagram illustrating an operation of a UE 100 in a DRX state in the RRC connected mode.

As illustrated in FIG. 6, the UE 100 in the DRX state in the RRC connected mode discontinuously monitors the PDCCH. A cycle in which the PDCCH is monitored is referred to as "DRX cycle". Furthermore, a monitoring duration occurring every DRX cycle is referred to as "On duration". The "On duration" is also sometimes referred to as "wake-up duration". A duration during which the PDCCH does not need to be monitored is also sometimes referred to as "sleep duration" (or "Opportunity for DRX").

The downlink data is transmitted via the PDSCH, and scheduling information (downlink scheduling information) of the PDSCH is included in the PDCCH. If the scheduling information is detected via the PDCCH in the "On duration", the UE 100 can use a PDSCH resource designated by the scheduling information to receive the downlink data.

The DRX cycle includes a short DRX cycle and a long DRX cycle. The duration length of the short DRX cycle and the duration length of the long DRX cycle are the same in "On duration", but different in the sleep duration. For example, the "On duration" can be configured from 1 ms to 200 ms by an "On duration timer". The long DRX cycle (and the offset time) is configured by "longDRX-CycleStartOffset", and the short DRX cycle is configured by "shortDRX-Cycle". It is noted that in the 3GPP specifications, if the DRX is configured, the long DRX is a mandatory function and the short DRX is an optional function. Therefore, the short DRX cycle may not be configured in the UE 100.

The DRX is controlled, based on a plurality of timers, as described below.

"drx-InactivityTimer": the number of consecutive subframes (PDCCH subframes) after correctly decoding a PDCCH indicating uplink (UL) or downlink (DL) user data scheduling "HARQ RTT Timer": the minimum number of subframes until DL HARQ retransmission is performed "drx-RetransmissionTimer": a duration used for retransmission Upon succeeding in decoding the PDCCH addressed to the UE 100 during the "On duration", the UE 100 activates the "drx-InactivityTimer". Simultaneously, the "HARQ RTT Timer" is activated. If the DL data is not correctly decoded, the "drx-RetransmissionTimer" is simultaneously activated upon expiration of the "HARQ RTT Timer". If correctly decoding the DL data after the retransmission of the DL data, the UE 100 stops the "drx-RetransmissionTimer". Then, the sleep duration is started at the same time as the "drx-InactivityTimer" expires.

It is noted that a state in which the "On duration timer", the "drx-InactivityTimer", or the "drx-RetransmissionTimer" is in operation, is referred to as "Active state". The UE 100 monitors the PDCCH in the Active state.

The eNB 200 configures, to the UE 100, the configuration information (the "On duration", various types of timers, the long DRX cycle, the short DRX cycle, and the like) including each parameter of the DRX described above, by "DRX-Config", which is an information element in an individual RRC message.

(Overview of TCP)

Figure 7:
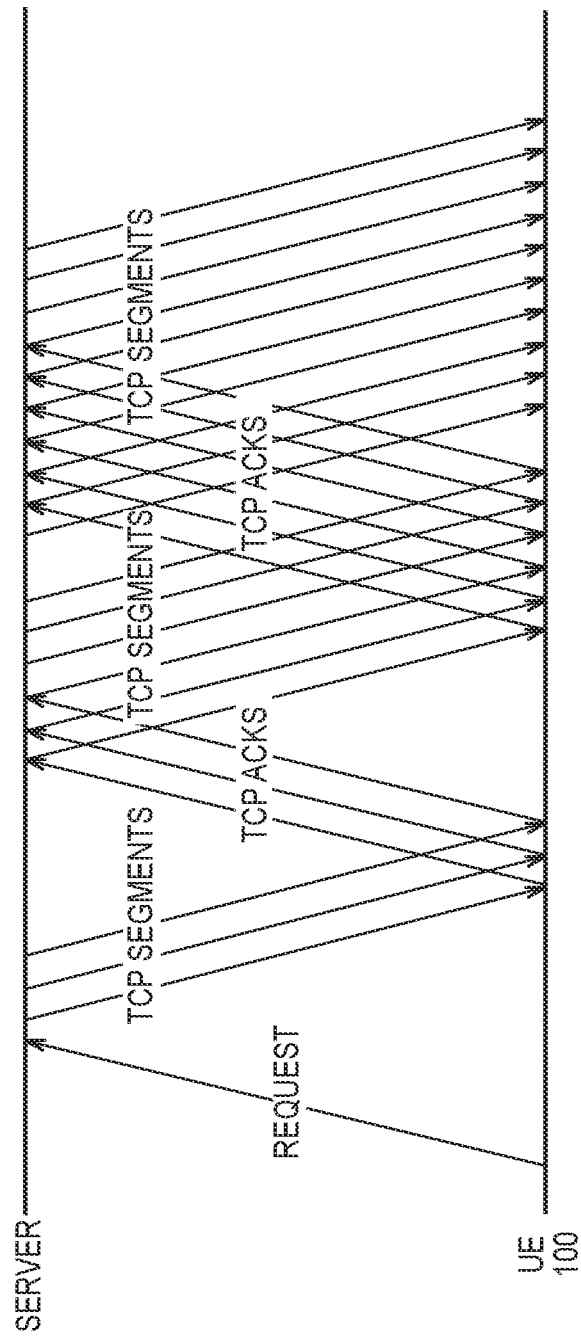
FIG. 7 is a diagram for describing an overview of a TCP.

FIG. 7 is a diagram for describing an overview of the TCP. In the embodiment, the UE 100 performs TCP communication, via a network of the LTE system, with a server on the Internet.

As illustrated in FIG. 7, the server determines a congestion state of the network, based on a "TCP ACK" from the UE 100. The server gradually increases a window size, in response to reception of the "TCP ACK". The window size is an amount of a "TCP Segment" continuously transmitted without waiting for the "TCP ACK". On the other hand, if failing to receive the "TCP ACK" (time-out), the server halves the window size. Such a control is referred to as "slow start".

Thus, the downlink TCP throughput cannot be improved unless the eNB 200 promptly transmits data (TCP Segment) in the downlink and the UE 100 promptly transmits the "TCP ACK" in the uplink. In other words, the downlink TCP throughput can be improved if the eNB 200 can shorten a time it takes from receiving the data from the EPC 20 to transmitting the data to the UE 100 (downlink transfer delay).

(An Example of Communication Sequence)

Figure 8:
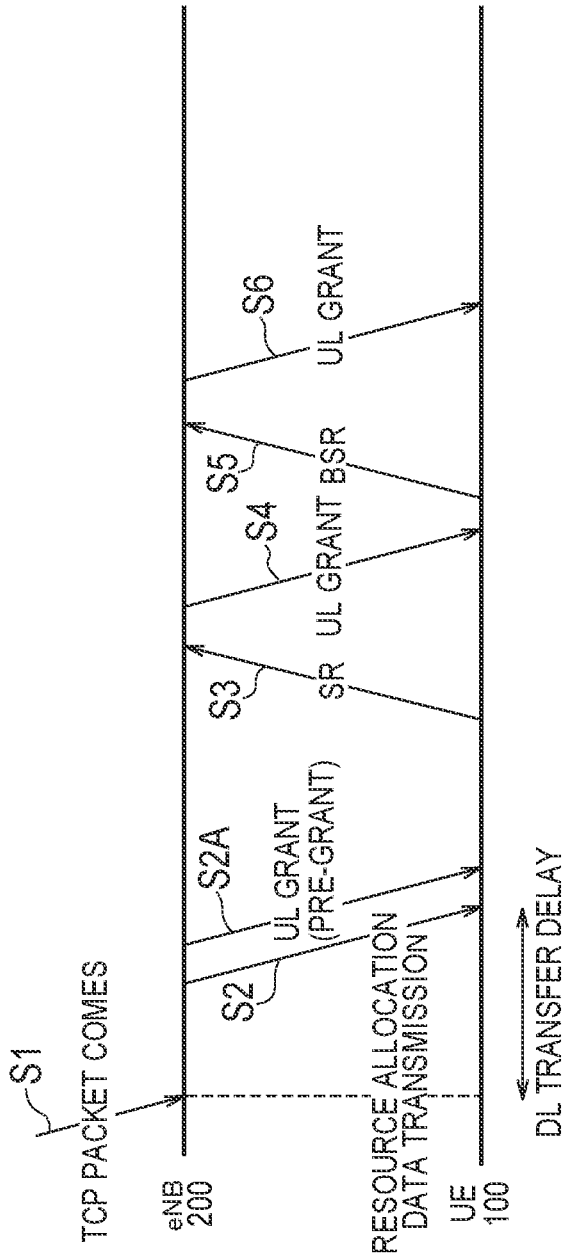
FIG. 8 is a diagram for describing an example of a communication sequence in the LTE system.

FIG. 8 is a diagram for describing an example of a communication sequence in the LTE system. In FIG. 8, the UE 100 performs the DRX operation in a state of establishing the RRC connection with the eNB 200 (that is, in the RRC connected mode).

As illustrated in FIG. 8, in step S1, the eNB 200 receives a TCP packet (TCP segment) from the EPC 20.

In step S2, the eNB 200 uses a PDCCH resource to allocate the PDSCH resource to the UE 100. Furthermore, the eNB 200 uses the PDSCH resource to transmit to the UE 100 the downlink data corresponding to the TCP packet received from the EPC 20. Specifically, the eNB 200 transmits, on the PDCCH, the DCI including the downlink scheduling information to the UE 100, and uses the PDSCH resource indicated by the DCI to transmit the downlink data to the UE 100.

However, after receiving the TCP packet from the EPC 20, the eNB 200 must wait for the data transmission to the UE 100 until the UE 100 is in the On duration. In particular, if the DRX cycle is long, the downlink transfer delay (DL transfer delay) may become a serious problem.

At this stage, the eNB 200 may allocate, by using the PDCCH resource, the (periodic) PUSCH resource to the UE 100 in advance (step S2A). Specifically, the eNB 200 may transmit the DCI including the uplink scheduling information (UL grant) on the PDCCH to the UE 100. Such a technique is referred to as "Pre-grant". It is noted that the following steps S3 to S6 correspond to an operation when the "Pre-grant" is not performed.

The UE 100 receives the downlink data and moves the downlink data to an upper layer of the UE 100. The upper layer of the UE 100 generates the TCP ACK to be notified to a lower layer of the UE 100. The UE 100 determines to request, to the eNB 200, the allocation of the PUSCH resource, in response to the presence of the uplink data (TCP ACK packet) in a transmission buffer (lower layer of the UE 100).

In step S3, the UE 100 uses the PUCCH resource to transmit to the eNB 200 the SR for requesting the allocation of the PUSCH resource.

In step S4, the eNB 200 allocates the PUSCH resource to the UE 100, in response to reception of the SR.

In step S5, the UE 100 uses the PUSCH resource allocated from the eNB 200 to transmit to the eNB 200 a BSR including buffer information indicating an amount of the uplink data in the transmission buffer of the UE 100.

In step S6, the eNB 200 allocates an appropriate amount of the PUSCH resource to the UE 100, in response to reception of the BSR. The UE 100 uses the PUSCH resource allocated from the eNB 200 to transmit to the eNB 200 the uplink data (TCP ACK packet) in the transmission buffer of the UE 100.

First Embodiment

Hereinafter, a first embodiment will be described.

The UE 100 according to the first embodiment performs the DRX operation for monitoring the PDCCH within the On duration occurring every DRX cycle. The UE 100 includes a receiver 110 configured to receive, from the eNB 200, special downlink control information not including the scheduling information via the PDCCH within the On duration, and a controller 130 configured to continue the monitoring of the PDCCH across a DRX inactivity duration, in response to the reception of the special downlink control information. The special downlink control information may include information for designating the DRX inactivity duration.

The eNB 200 according to the first embodiment performs communication with the UE 100 configured to perform the DRX operation for monitoring the PDCCH within the On duration occurring every DRX cycle. The eNB 200 includes a controller 230 configured to perform a process of transmitting, to the UE 100, the special downlink control information not including the scheduling information via the PDCCH within the On duration. The special downlink control information is used for the UE 100 to continue the monitoring of the PDCCH across the DRX inactivity duration. The special downlink control information may include information for designating the DRX inactivity duration.

Figure 9:
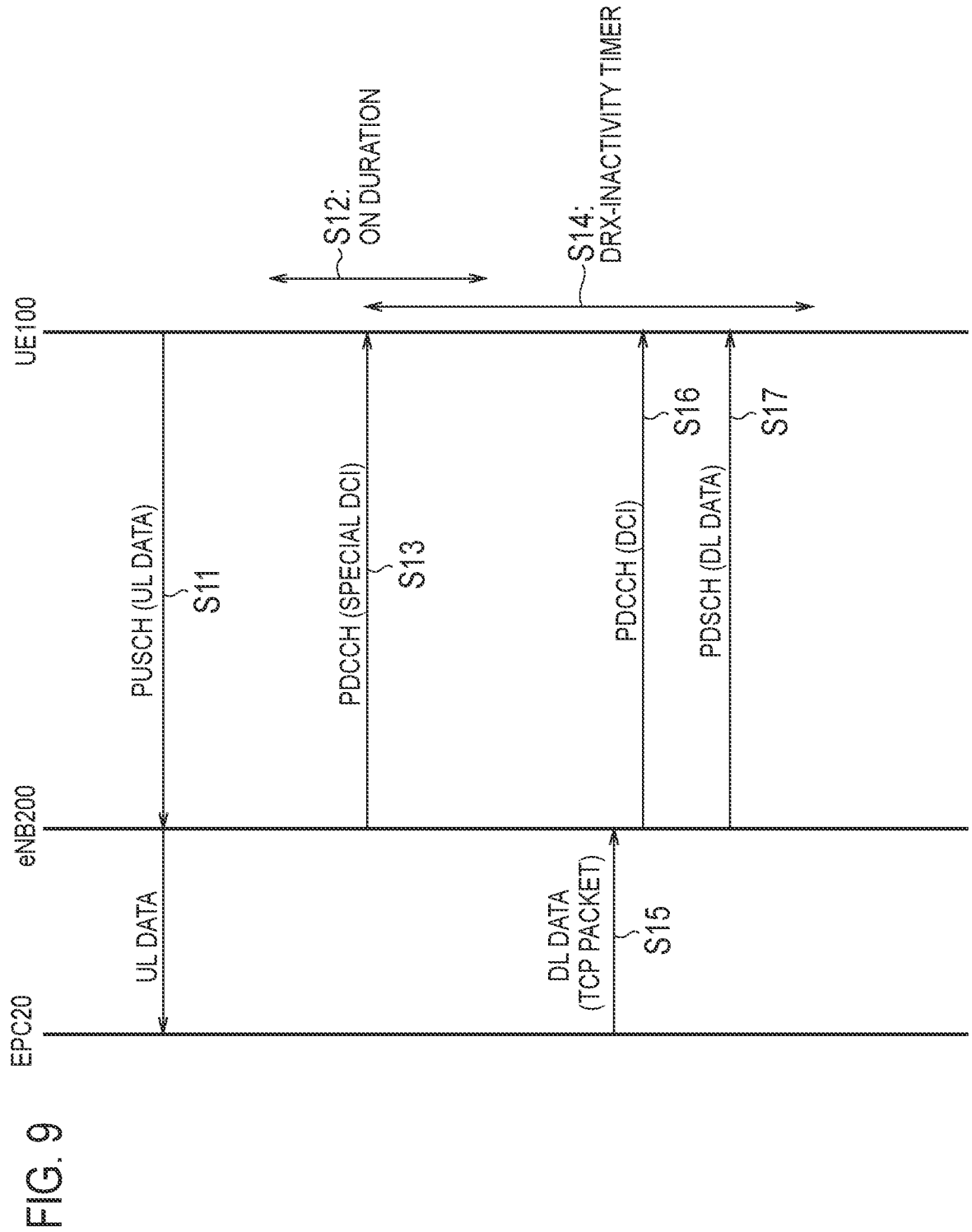
FIG. 9 is a diagram illustrating an example of an operation sequence according to a first embodiment.

FIG. 9 is a diagram illustrating an example of an operation sequence according to the first embodiment. In FIG. 9, the UE 100 performs the DRX operation in a state of establishing the RRC connection with the eNB 200 (that is, in the RRC connected mode).

In step S11, the UE 100 transmits the uplink data (UL data) to the eNB 200 via the PUSCH. The UL data is a get command of FTP (File Transfer Protocol), for example.

However, step S11 is not mandatory and thus may be omitted. The eNB 200 transfers, to the EPC 20, the UL data received from the UE 100.

In step S12, the UE 100 monitors the PDCCH within the On duration.

In step S13, the eNB 200 transmits, to the UE 100, the special downlink control information (DCI) not including the scheduling information ("Resource block assignment" and MCS) via the PDCCH within the On duration. The special DCI does not include HARQ process information, a TCP command, and the like. That is, the special DCI is substantially empty DCI. The eNB 200 may transmit the special DCI to the UE 100, in response to the reception of the UL data from the UE 100.

In step S14, the UE 100 starts the "drx-InactivityTimer", in response to the successful decoding of the PDCCH addressed to the UE 100 within the On duration. That is, the UE 100 shifts to the DRX inactivity duration defined by the "drx-InactivityTimer" and continues monitoring the PDCCH across the DRX inactivity duration.

It is noted that the special DCI may include information for designating a temporarily used value (subframe number) of the "drx-InactivityTimer". In this case, the UE 100 performs the monitoring of the PDCCH during the designated subframe duration.

In step S15, the eNB 200 receives data (a TCP packet) from the EPC 20. It is noted that if transmitting the special DCI to the UE 100, the eNB 200 recognizes that the UE 100 is in a state of continuing the monitoring of the PDCCH (that is, in the Active state) even after ending the On duration. Thus, the eNB 200 determines that it is possible to transmit the PDCCH (and DL data) to the UE 100 even after ending the On duration.

In step S16, the eNB 200 transmits, to the UE 100, DCI including downlink scheduling information on the PDCCH.

In step S17, the eNB 200 uses the PDSCH resource indicated by the DCI (downlink scheduling information) to transmit the downlink data (DL data) to the UE 100. The UE 100 receives the DL data.

In this manner, according to the first embodiment, the eNB 200 can promptly perform the data transmission to the UE 100 after receiving the TCP packet from the EPC 20. Thus, even if the DRX cycle is long, it is possible to shorten downlink transfer delay (DL transfer delay). As a result, the downlink TCP throughput can be improved.

Second Embodiment

A second embodiment will be described while focusing on differences from the first embodiment, below.

The UE 100 according to the second embodiment performs a DRX operation. The UE 100 includes: a transmitter 120 configured to transmit, to the eNB 200, a notification indicating that reception of downlink data is predicted when transmitting uplink data to the eNB 200, and a controller 130 configured to continuously monitor the PDCCH, even out of an On duration in a predetermined duration after transmitting the notification. The notification may include at least one of: information indicating the predetermined duration, information indicating an allocation data amount or the throughput expected for the reception of downlink data, information indicating a timing at which the reception of downlink data is predicted, and information indicating start of continuous monitoring of the PDCCH. These pieces of information can be obtained from an application layer of the UE 100 and the like, for example.

The eNB 200 according to the second embodiment performs communication with the UE 100 configured to perform the DRX operation. The eNB 200 includes a receiver 220 configured to receive, from the UE 100, a notification indicating that reception of downlink data is predicted when receiving uplink data from the UE 100, and a controller 230 configured to perform a process of transmitting, to the UE 100, downlink control information (DCI) via the PDCCH, even out of an On duration in a predetermined duration after receiving the notification.

Figure 10:
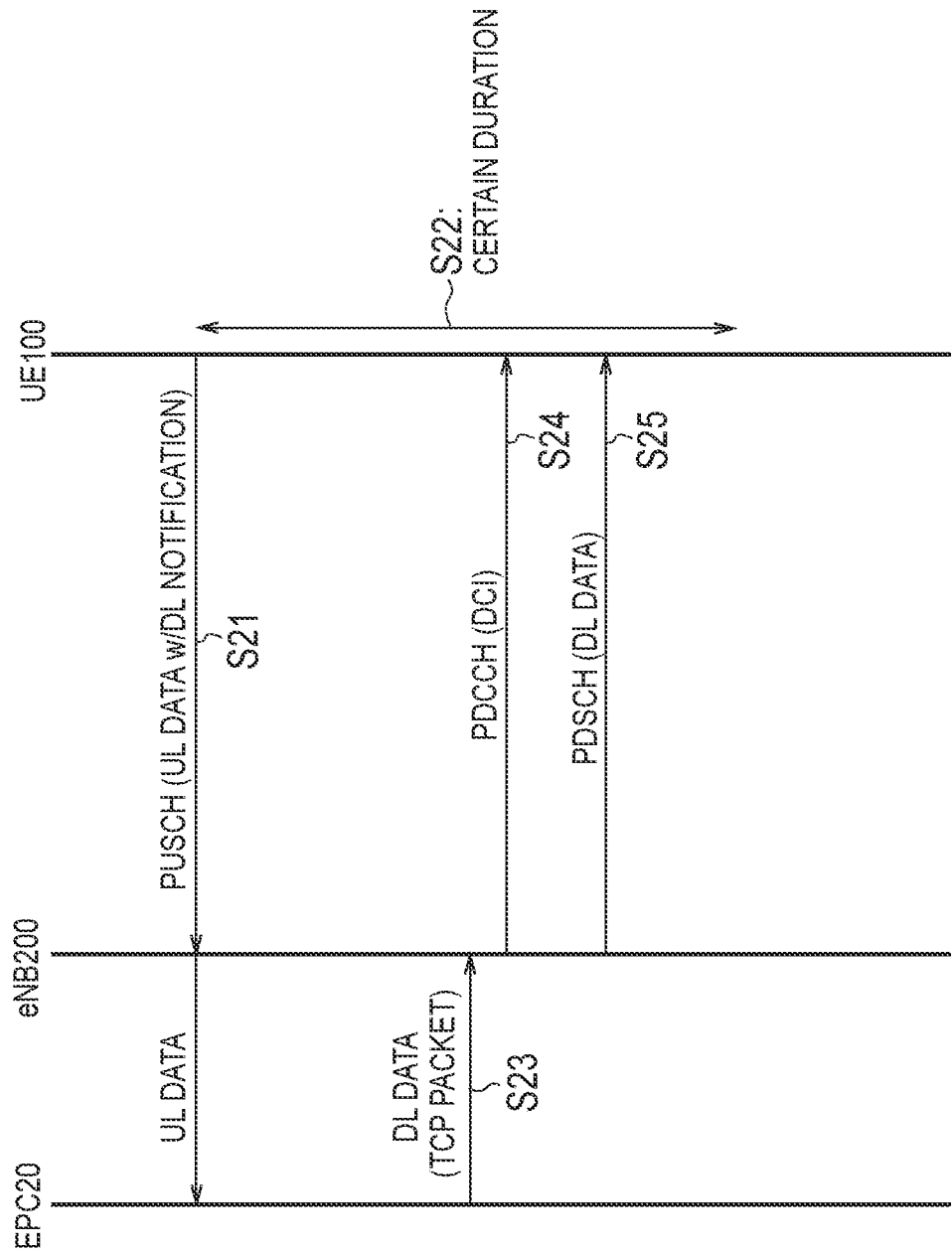
FIG. 10 is a diagram illustrating an example of an operation sequence according to a second embodiment.

FIG. 10 is a diagram illustrating an example of an operation sequence according to the second embodiment. In FIG. 10, the UE 100 performs the DRX operation in a state of establishing the RRC connection with the eNB 200 (that is, in the RRC connected mode).

In step S21, the UE 100 transmits the uplink data (UL data) to the eNB 200 via the PUSCH. The UL data is a get command of the FTP, for example. The UE 100 transmits, to the eNB 200, the notification (hereinafter, "DL notification") indicating that the downlink data (DL data) reception is predicted when transmitting the UL data to the eNB 200. The DL notification is transmitted by a MAC control element (MAC layer signaling), for example. The eNB 200 transfers the UL data received from the UE 100 to the EPC 20. Furthermore, if receiving the DL notification from the UE 100, the eNB 200 recognizes that the UE 100 is in a state of continuing the monitoring of the PDCCH (that is, in the Active state) for a certain duration, even out of the On duration. Thus, the eNB 200 determines that the transmission of the PDCCH (and DL data) to the UE 100 is possible for the certain duration, even out of the On duration.

The DL notification may include at least one of: information indicating the certain duration, information indicating the allocation data amount or the throughput expected for the DL data reception, and information indicating a timing at which the reception of the DL data is predicted (for example, after 15 subframes). These pieces of information are utilized by the eNB 200 in a DL data transmission process (steps S24 and S25).

In step S22, the UE 100 activates a timer corresponding to the certain duration, in response to the transmission of the DL notification. That is, the UE 100 shifts to the DRX inactivity duration defined by the timer and continues the monitoring of the PDCCH across the DRX inactivity duration.

In step S23, the eNB 200 receives the data (TCP packet) from the EPC 20.

In step S24, the eNB 200 transmits the DCI including the downlink scheduling information to the UE 100 on the PDCCH. If the information indicating the allocation data amount or the throughput expected for the DL data reception is included in the DL notification, the eNB 200 generates downlink scheduling information, based on the information.

In step S25, the eNB 200 uses the PDSCH resource indicated by the DCI (downlink scheduling information) to transmit the DL data to the UE 100. The UE 100 receives the DL data.

In this manner, according to the second embodiment, the downlink transfer delay (DL transfer delay) can be shortened similarly to the first embodiment. As a result, the downlink TCP throughput can be improved.

Modification of Second Embodiment

The sequence illustrated in FIG. 10 can be partially modified as described below.

During the UL data transmission in step S21, the UE 100 may notify the eNB 200 of an indication for starting the continuous monitoring of the PDCCH by a MAC CE and the like, and start the PDCCH monitoring in step S22 (that is, temporarily pause the DRX operation).

Furthermore, the UE 100 may stop the continuous monitoring of the PDCCH in step S22 when the DL data is transmitted next, and return to the normal DRX operation (implicit PDCCH continuous monitor stop). Alternatively, the UE 100 may receive the DL data corresponding to the UL data transmission (get command) in step S21, and stop the continuous monitoring of the PDCCH if the DL data reception is notified from the upper layer, for example. In this case, the UE 100 may notify the eNB 200 of the stop of the PDCCH monitoring by the MAC CE and the like (explicit PDCCH continuous monitoring stop).

Third Embodiment

A third embodiment will be described while focusing on the differences from the first embodiment and the second embodiment, below.

The UE 100 according to the third embodiment performs the DRX operation. The UE 100 includes a controller 130 configured to monitor the PHICH for receiving an ACK/NACK (HARQ ACK/NACK) corresponding to the uplink data from the eNB 200 after transmitting the uplink data to the eNB 200. It is noted that according to the LTE specifications, the UE 100 monitors the PHICH regardless of the On duration. The controller 130 of the UE 100 also monitors the PDCCH when monitoring the PHICH, even out of the On duration.

The eNB 200 according to the third embodiment performs communication with the UE 100 configured to perform the DRX operation. The eNB 200 includes a controller 230 configured to perform a process of transmitting, to the UE 100, the ACK/NACK corresponding to the uplink data via the PHICH after receiving the uplink data from the UE 100. Even if being out of the On duration, the controller 230 transmits the downlink control information (DCI) to the UE 100 via the PDCCH when transmitting the ACK/NACK.

Figure 11:
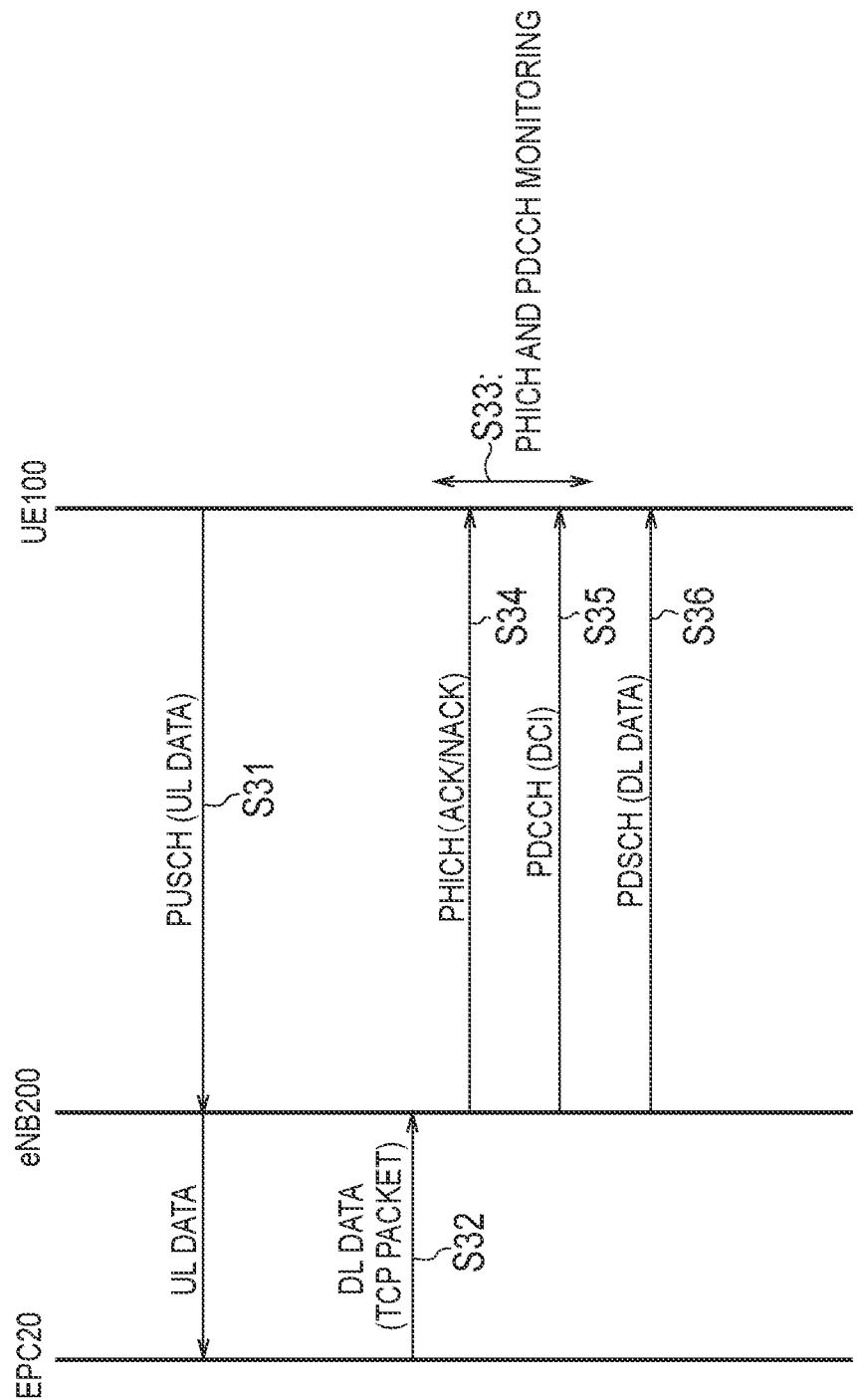
FIG. 11 is a diagram illustrating an example of an operation sequence according to a third embodiment.

FIG. 11 is a diagram illustrating an example of an operation sequence according to the third embodiment. In FIG. 11, the UE 100 performs the DRX operation in a state of establishing the RRC connection with the eNB 200 (that is, in the RRC connected mode).

In step S31, the UE 100 transmits the uplink data (UL data) to the eNB 200 via the PUSCH. The eNB 200 transfers, to the EPC 20, the UL data received from the UE 100.

In step S32, the eNB 200 receives the data (TCP packet) from the EPC 20.

In step S33, the UE 100 monitors the PHICH to receive, from the eNB 200, the ACK/NACK corresponding to the UL data. The UE 100 also monitors the PDCCH when monitoring the PHICH, even out of the On duration. Specifically, the UE 100 monitors the PDCCH in a subframe in which the PHICH is monitored.

In step S34, the eNB 200 transmits the ACK/NACK corresponding to the UL data to the UE 100 via the PHICH. The UE 100 receives the ACK/NACK.

In step S35, the eNB 200 transmits, to the UE 100, the DCI including the downlink scheduling information on the PDCCH. The UE 100 receives the DCI. The DCI may include the uplink scheduling information (UL grant), in addition to the downlink scheduling information or instead of the downlink scheduling information.

In step S36, the eNB 200 uses the PDSCH resource indicated by the DCI (downlink scheduling information) to transmit the DL data to the UE 100. The UE 100 receives the DL data.

In this manner, according to the third embodiment, the downlink transfer delay (DL transfer delay) can be shortened similarly to the first embodiment. As a result, the downlink TCP throughput can be improved.

OTHER EMBODIMENTS

Figure 12:
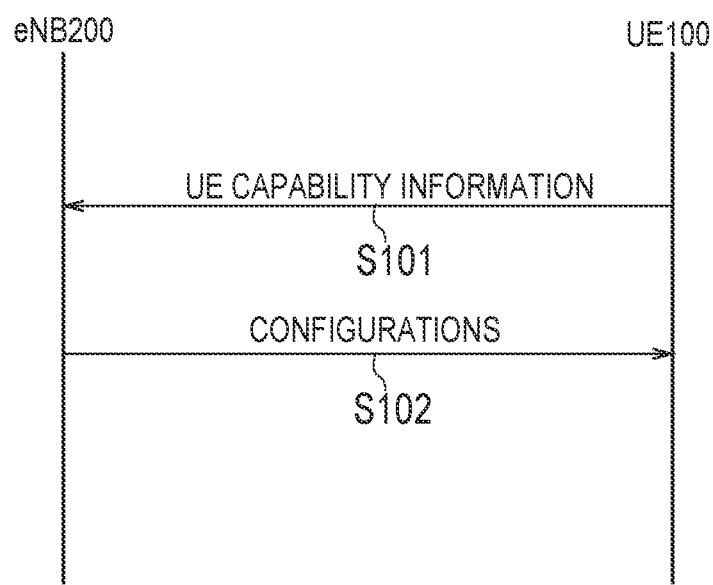
FIG. 12 is a diagram illustrating an operation according to a modification of the first embodiment to the third embodiment.

FIG. 12 is a diagram illustrating an operation according to a modification of the embodiment. The present modification relates to a method of appropriately controlling the operations according to the embodiments described above (that is, the operation of shortening downlink transfer delay). In an initial state in FIG. 12, the UE 100 is in the RRC connected mode in the cell of the eNB 200.

As illustrated in FIG. 12, the UE 100 transmits, to the eNB 200, capability information (UE Capability Information) indicating that the UE 100 has a function according to the embodiment (that is, a function of shortening downlink transfer delay) (step S101). The eNB 200 receives the "UE Capability Information". However, the eNB 200 may acquire the "UE Capability Information" from the MME 300, without receiving the "UE Capability Information" from the UE 100. Based on the "UE Capability Information", the eNB 200 acknowledges that the UE 100 has the function according to the embodiment. Alternatively, the UE 100 may transmit, to the eNB 200, an interest notification indicating that the UE 100 has an interest in the function of shortening the downlink transfer delay. The interest notification may be transmitted from the UE 100 to the eNB 200 by "UE Assistance Information" that is one type of an RRC message. The UE 100 may transmit, to the eNB 200, either only one or both of the "UE Capability Information" and the interest notification (UE Assistance Information). The eNB 200 transmits, to the UE 100, configuration information (Configurations) including parameters related to the function according to the embodiment (step S102). The UE 100 stores the Configurations (parameters). The UE 100 performs the operations according to the above-described embodiments, only if storing the Configurations (parameters).

In the above-described embodiments, the LTE system is exemplified as the mobile communication system. However, the present application is not limited to the LTE system. The present application may be applied to systems other than the LTE system.

APPENDIX

1. Introduction

A new study item on latency reduction techniques for LTE was approved. The objective of the study identifies two technical areas to reduce packet data latency as follows.

Fast uplink access solutions [RAN2]:
From RAN1#83: TTI shortening and reduced processing times [RAM]:
The fast uplink access solution is expected to improve resource efficiency comparing to some implementation techniques with and without preserving the current TTI length and processing time, i.e., TTI shortening.

In this appendix, the initial consideration to study on fast uplink access solution is provided.

2. Discussion (2.1. Working Assumptions)

The motivation documents of this study show that the current standardized mechanism for uplink resource allocation compress the potential throughput performance of LTE from TCP throughput perspective. The degradation of TCP throughput is caused by the TCP slow start algorithm due to round-trip-time latency, i.e., TCP-ACK transmission in UL. So, the fast uplink access solution is expected to improve user experiences provided by upper layer built on TCP layer. For the working assumptions, the SID mentions for the fast uplink access solutions.

The study area includes resource efficiency, including air interface capacity, battery lifetime, control channel resources, specification impact and technical feasibility. Both FDD and TDD duplex modes are considered.

As first aspect, potential gains like reduced response time and improved TCP throughput due to latency improvements on typical applications and use cases are identified and documented. In this evaluation RAN2 may assume latency reductions due to protocol enhancements as well as shortened TTIs. In conclusion, this aspect of the study is supposed to show what latency reductions would be desirable [RAN2].

The solutions are expected to improve network capacity, UE power consumption, control channel resources. Especially, improved TCP throughput could be considered as a key performance indicator.

Observation 1; DL TCP throughput is expected to be improved by UL latency reduction solutions.

For the fast uplink access solution-specific aspect; for active UEs and UEs that have been inactive a longer time, but are kept in RRC Connected, focus should be on reducing user plane latency for the scheduled UL transmission and getting a more resource efficient solution with protocol and signaling enhancements, compared to the pre-scheduling solutions allowed by the standard today, both with and without preserving the current TTI length and processing times.

The active UE is assumed to be transmitting/receiving the data continuously, so the UE is considered to be in Active Time, i.e., DRX is not applied because of the inactivity timer running.

Observation 2: UEs in Active Time are taken into account.

The UE that has been inactive for a longer time but is kept in RRC Connected could be interpreted that the UE applies the long DRX cycle and needs at least to send SR and BSR to perform uplink transmission. In addition, when the time alignment timer, TAT, has expired the UE initiates the random access procedure before SR transmission, which degrades user experience, i.e., response time in practice.

Observation 3: UEs with applying long DRX cycle and no UL grant are taken into consideration.

Observation 4: Time alignment timer may have expired if the UE has been inactive for a long time.

Compared to the pre-scheduling solution, the fast uplink access solution should be more resource efficient even if the current TTI length and processing times are assumed. The TTI shortening is more generic solution and is expected to reduce the latency of uplink access latency as well as downlink delivery thanks to increased HARQ interactions.

Observation 5: The fast uplink solution has gains independent of TTI shortening approach.

It is mentioned in the motivation documents that a possible approach for the fast uplink access is based on an implementation technique, the pre-scheduling whereby the eNB allocates uplink resources before SR reception. However, the pre-scheduling technique consumes radio resources in uplink (i.e., PUSCH) and downlink control channel (i.e., PDCCH) even if the UE has no uplink data to send. It is also discussed that in case the existing SPS is used for the pre-scheduling, the UE needs to transmit padding data to avoid the implicit release of configured SPS resources. So, the motivation documents proposed that standardized approaches are expected to enhance the pre-scheduling technique, which may include pre-grant, SPS-like mechanism, no padding when no data is available and/or smooth transition to dynamic scheduling.

Observation 6: The standardized approach is expected to enhance resource efficiency compared to the implementation technique.

(2.2. Typical Use Cases)

The increase of today's mobile traffic is caused by the growth of mobile video traffic and this trend is expected to dominate future traffic according to public reports. It is well-known that video streaming typically uses TCP (HTTP over TCP), unless it's for live-streaming (over UDP). So, the use case of video streaming is in-line with the scope of this study.

The reports also point out that the social networking and web browsing use mobile traffic as the second dominant applications, whereby these applications are typically built on HTTP and therefore uses TCP. As many 3GPP delegates are already familiar with, the 3GPP FTP service may be continually accessed by each delegate to download Tdocs, which also uses TCP. Therefore, the behaviours on the applications built on HTTP or FTP should be considered as typical use cases.

Proposal 1: User behaviours on the applications built on HTTP and FTP should be considered as typical use cases in this study.

FIG. 13 includes a diagram illustrating top five applications based on the mobile traffic volume, and a diagram illustrating a mobile application analysis.

Figure 14:
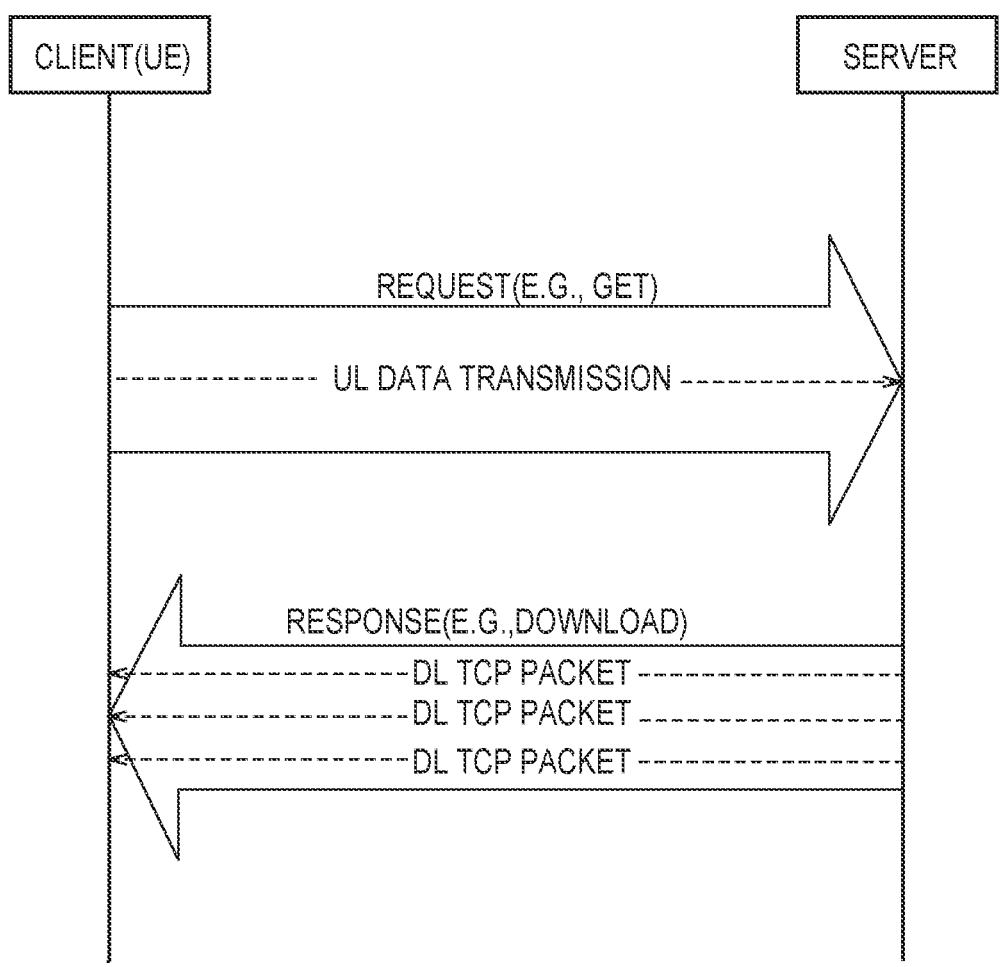
FIG. 14 is a diagram illustrating a modeling for a case of typical usage with HTTP/FTP.

The most typical behavior on such application can be modelled as a request/response dialog. For example, when the user wants to download a file over FTP, the client sends the RETR command (a.k.a., get) to the server first and then the file downloading starts. The same behavior is also applicable to HTTP, whereby the web browser sends GET first then the webpage is downloaded when the user opens the webpage, as illustrated in FIG. 14. Considering the typical behavior, RAN2 should discuss whether the first uplink data transmission in advance of corresponding DL TCP packet (e.g., a request like GET) can be just assumed or should be also enhanced in the fast uplink access solutions.

Proposal 2: RAN2 should discuss whether the first uplink data transmission in advance of corresponding DL TCP packet can be just assumed or should be also enhanced in the fast uplink access solutions.

(2.3. Essential Issues)

As mentioned in section 2.1, the critical issues leading to uplink access latency cannot be resolved by either the pre-scheduling technique or the pre-grant technique using enhanced SPS.

Critical Issue 1: DL Transfer Delay

DL transfer delay is caused by the long DRX cycle. In the worst case, the serving cell needs to wait for the transmission opportunity during 10~2560 subframes after DL TCP packet reception.

Critical Issue 2: Too Early/Late Allocation

Too early allocation may be caused by the pre-scheduling technique or the pre-grant approach before SR reception. On the other hand, too late allocation is possible due to the SR periodicity, i.e., the SR period*sr-ProhibitTimer, or a scheduler implementation that is too simple, i.e., one that allocates uplink resources for the TCP ACK packet based on corresponding BSR reception (so 7 subframes after UE's SR transmission).

Critical Issue 3: Too Much/Less Allocation

Too much/few allocation may be caused by the pre-scheduling technique or the pre-grant approach before BSR. Without knowledge of UE's buffer status, the scheduler needs to blindly allocate the uplink resources.

Critical Issue 4: Initial Uplink Delay

As stated in Observation 4, the UE should initiate the random access procedure before any uplink transmission when TAT expires.

Of course, smart implementations may reduce some of the negative impacts due to the three critical issues, e.g., comprehending inside of the DL IP packet and allocating uplink resources based on usage of previous uplink grants. However, the standardized approach will be expected to resolve most if not all the issues listed above.

Proposal 3: DL transfer delay, too early/late allocation, too much/less allocation, TAT expiry should be optimized by the fast uplink access solutions.

(2.4. Potential Solution Approaches)

Figure 15:
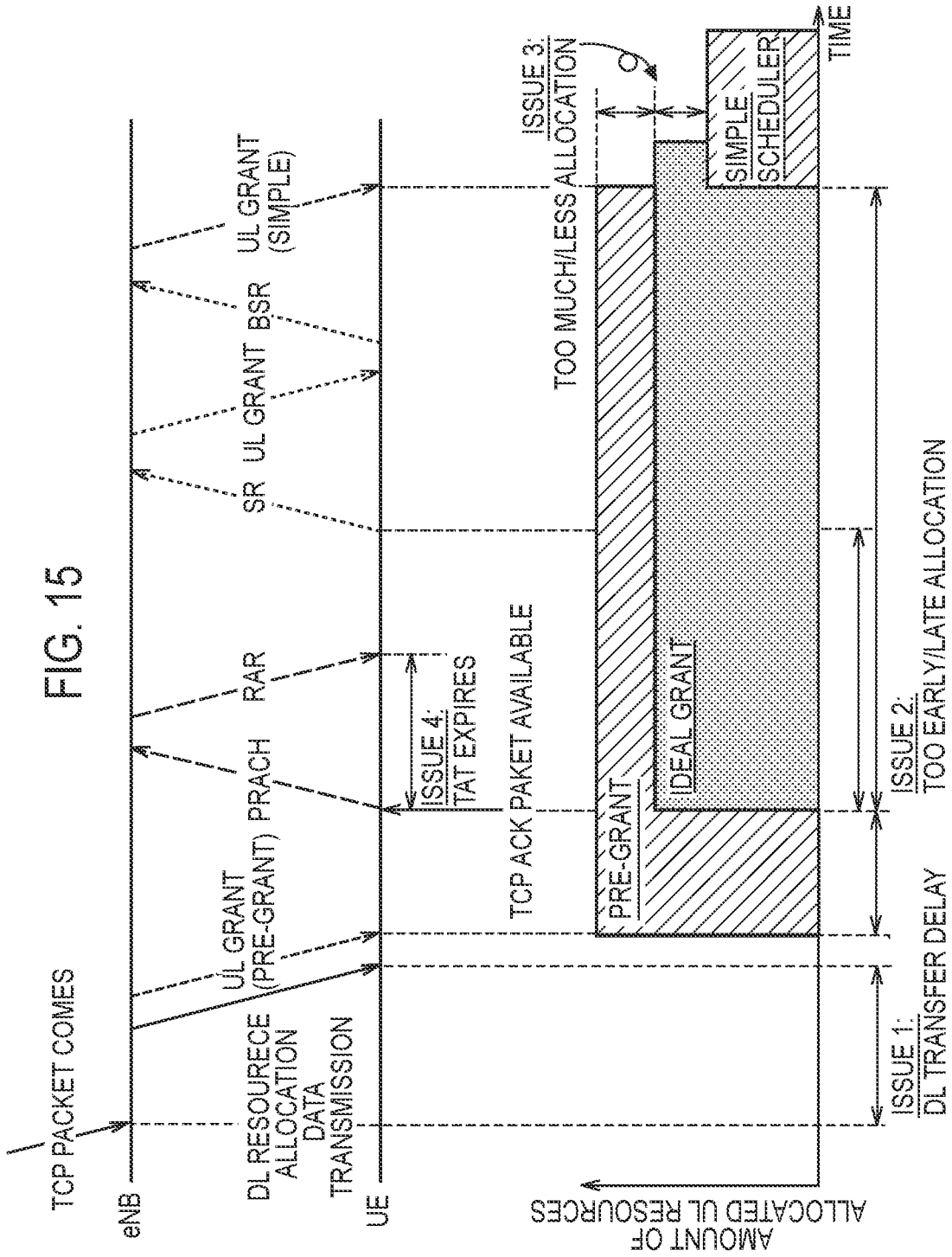
FIG. 15 is a diagram illustrating a possible problem according to an additional mark.

As discussed in section 2.3, the critical issues will not be resolved, unless the DRX, SR, BSR and/or procedures are revisited. These issues will not be addressed even if the pre-grant approach using enhanced SPS is applied, since the mismatch the actual grant and ideal allocation (FIG. 15) causes worse resource efficiency, including air interface capacity, battery lifetime, control channel resources.

Observation 7: While the pre-grant approach may have better performance compared to the existing implementation technique, it will still not resolve the critical issues.

To resolve the critical issues, the following solution approaches may be considered:

Extended OnDuration handling in DRX for the fast DL allocation, e.g., triggered by the first UL transmission (i.e., GET).

Reduction of signaling round-trip for the first UL packet transmission, e.g., by integrating SR and BSR.

Shorter SR periodicity with less impact to spectral efficiency [RAN1].

RACH procedure enhancements, e.g., with additional functionality for UL data grant.

Therefore, RAN2 should study not only UL grant mechanism itself but also the procedures related to UL grant.

Proposal 4: RAN2 should also study the enhancements of DRX, SR, BSR and RACH.

3. Conclusion

In this paper, the working assumptions are suggested based on the approved work item description. The typical use cases and the modelling are provided. Four critical issues and potential solution approaches are identified for this study.

CROSS REFERENCE

The entire contents of U.S. Provisional Application No. 62/162,123 (filed on May 15, 2015) are incorporated herein by reference.

INDUSTRIAL APPLICABILITY

The present application is useful in the field of communication.

The invention claimed is:

1. A radio terminal, comprising:
a receiver configured to receive a Radio Resource Control (RRC) message including DRX (Discontinuous reception) configuration information from a base station, the DRX configuration information setting a DRX cycle including an On duration, and
a controller configured to monitor a PDCCH (Physical Downlink Control Channel) within the On duration occurring every DRX cycle, wherein
the receiver is further configured to receive from the base station via the PDCCH within the On Duration, special downlink control information, the special downlink control information including information designating a first duration as a duration of a DRX inactivity timer, and the special downlink control information not including scheduling information allocating a PDSCH (Physical Downlink Shared Channel) radio resource; and
the controller is configured to:
start the DRX inactivity timer having the first duration upon receiving the special downlink control information; and
continue to monitor the PDCCH across the first duration of the DRX inactivity timer.

2. The radio terminal according to claim 1, wherein
the DRX configuration information includes information designating a second duration as the duration of the DRX inactivity timer, a length of the second duration being different from a length of the first duration, and
the controller is configured to
receive from the base station via the PDCCH within the On duration, downlink control information including scheduling information, and
start the DRX inactivity timer having the second duration upon receiving the downlink control information including the scheduling information allocating the PDSCH radio resource.

3. A method used in a radio terminal, comprising:
receiving a Radio Resource Control (RRC) message including DRX (Discontinuous reception) configuration information from a base station, the DRX configuration information setting a DRX cycle including an On duration;
monitoring a PDCCH (Physical Downlink Control Channel) within the On duration occurring every DRX cycle;
receiving from the base station via the PDCCH within the On Duration, special downlink control information, the special downlink control information including information designating a first duration as a duration of a DRX inactivity timer, and the special downlink control information not including scheduling information allocating a PDSCH (Physical Downlink Shared Channel) radio resource;
starting the DRX inactivity timer having the first duration upon receiving the special downlink control information; and
continuing to monitor the PDCCH across the first duration of the DRX inactivity timer.

* * * * *